(12) United States Patent
Graefer et al.

(10) Patent No.: US 6,230,873 B1
(45) Date of Patent: May 15, 2001

(54) CONVEYOR SYSTEM FOR AUTOMATICALLY TRANSPORTING ITEMS

(75) Inventors: Dominik Graefer, Novi, MI (US); Franz-Josef Herchenbach, Altdorf (DE); Michele Vitalini, Ypsilanti, MI (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/367,086

(22) PCT Filed: Jan. 26, 1998

(86) PCT No.: PCT/DE98/00234

§ 371 Date: Aug. 9, 1999

§ 102(e) Date: Aug. 9, 1999

(87) PCT Pub. No.: WO98/34859

PCT Pub. Date: Aug. 13, 1998

(30) Foreign Application Priority Data

Feb. 7, 1997 (DE) ............................................. 197 04 701

(51) Int. Cl.[7] .................................................. B65G 47/38
(52) U.S. Cl. ..................... 198/370.04; 198/890; 414/382
(58) Field of Search ..................................... 414/339, 377, 414/381, 382, 383, 384, 337; 198/890, 370.01, 890.1, 370.04; 105/261.1, 268, 269; 104/290

(56) References Cited

U.S. PATENT DOCUMENTS 5,018,928    5/1991   Hartlepp .

FOREIGN PATENT DOCUMENTS

652650B  *  2/1993  (AU) ............................... 198/370.04
90/09944    9/1990  (WO) .

* cited by examiner

*Primary Examiner*—Frank E. Werner
(74) *Attorney, Agent, or Firm*—Venable; Gabor J. Kelemen

(57) ABSTRACT

A conveyor system for automatically transporting items along a conveyor path has at least one guide rail and a plurality of vehicles. The vehicles each have a load carrier movable between a substantially horizontal position and two different tilted positions. A lever gauge is movable in an E-shaped shifting gate and a disconnect element is located on the vehicle to move the lever gage between a position engaging the guide rail and a position not engaging the guide rail.

2 Claims, 4 Drawing Sheets

CONVEYOR SYSTEM FOR AUTOMATICALLY TRANSPORTING ITEMS

BACKGROUND OF THE INVENTION

The invention relates to a conveyor system for automatically transporting items, particularly mail items, along a conveyor path by means of vehicle systems, with the vehicles having load carriers that can be positioned horizontally in a stable manner for receiving unit loads; for unloading the loads, a lever gauge of the load carriers extends horizontally into a guide rail disposed to the side of the conveyor path at predetermined unloading stations, causing the lever gauge to be vertically deflected as the vehicle system travels further, the deflection effecting a tilting of the load carrier, by way of a mechanical diversion, into one of two stable tilting positions, and with the tilted load carriers being reset by way of the lever gauges and guide rails designed specifically for this purpose.

So-called tilting-bucket sorters have long been used in practice to transport and sort unit loads. The items are received by rail vehicles having load carriers on their top side; these load carriers are held horizontally for load transport, and can be tilted for ejecting the load.

A conveyor system of the type mentioned at the outset is known from WO 90/09944. This system comprises vehicle systems whose vehicles do not have their own drive, and all active functions are initiated by way of path devices.

U.S. Pat. No. 5,018,928 discloses a tilting-bucket sorter having an active traction vehicle for the vehicle systems, in which, however, a relatively complicated tilting mechanism is used.

SUMMARY OF THE INVENTION

It is the object of the invention to configure a conveyor system of the type mentioned at the outset so as to prevent, as simply as possible, an undesired engagement of the lever gauge for tilting the load carriers.

According to the invention, the object is accomplished in that at least one vehicle of the vehicle system has its own drive, and that the lever gauge can be located outside of the regions of engagement of the guide rails in the stable, horizontal load-carrier position, and does not enter the region of engagement until an active disconnect element on the vehicle is actuated.

Because the drive and the disconnect element can be fed by a common energy source, for example by the electrical current of the system, the embodiment is extremely simple.

Because only a single lever gauge is guided in an E-shaped shifting gate on the respective vehicle, with the upper and lower legs of each shifting gate defining one of the two stable tilting positions and the center leg defining the stable horizontal position, a single lever gauge can be used to attain tilting to two sides.

BRIEF DESCRIPTION OF THE DRAWINGS

An embodiment of the invention is illustrated in the drawing and explained in detail below.

DETAILED DESCRIPTION OF THE PREFERRED EMBODIMENTS

Figure 1:
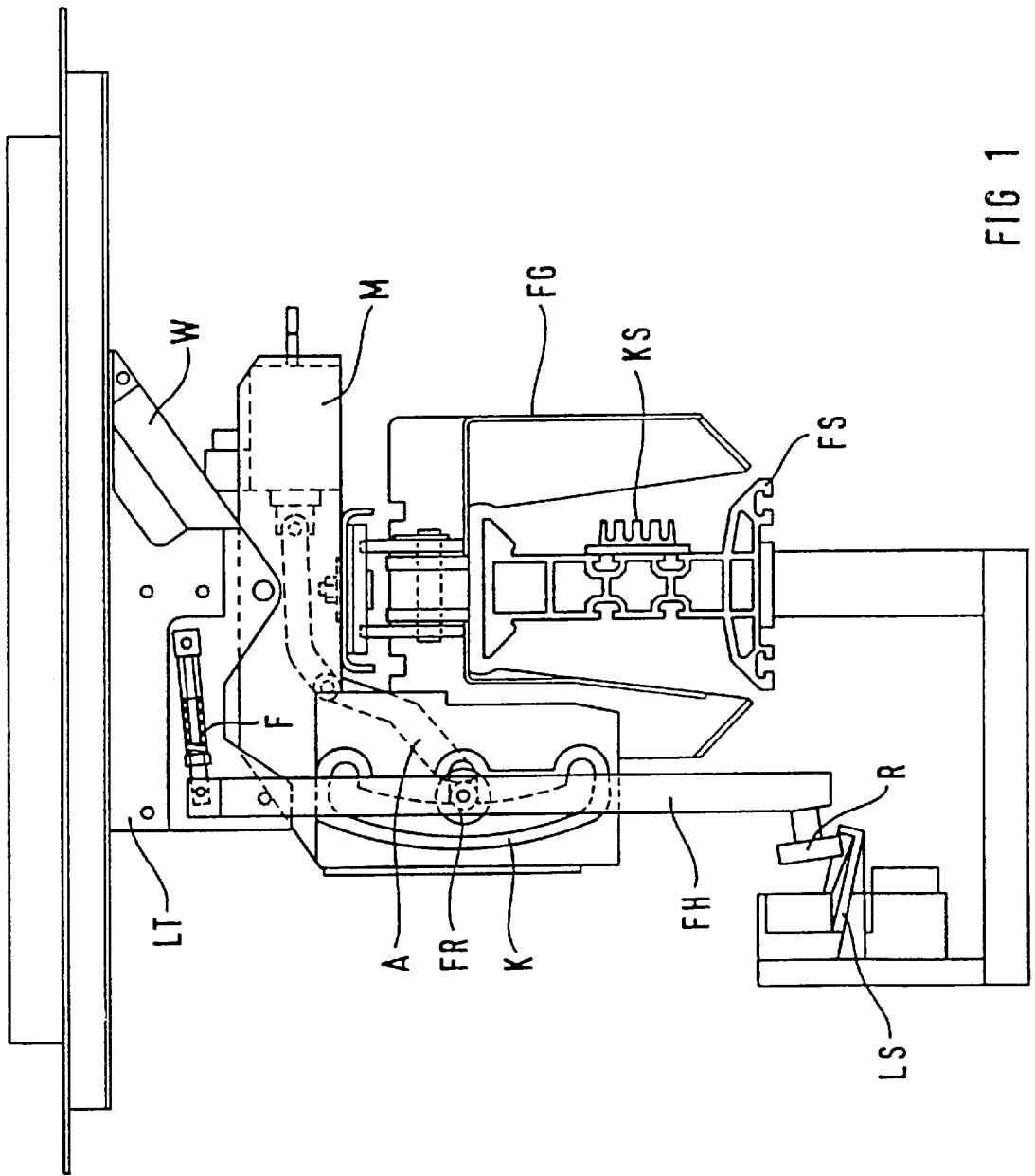
FIG. 1 shows the arrangement of all essential components of a vehicle having a load carrier.

The representation according to FIG. 1 is a section through a running rail FS, which virtually has a double-T structure. The angled, opposite flanks of the double-T structures serve as guide tracks for the wheels of vehicles that move along the running rail FS, the wheels being omitted for the sake of a clear overview. The undercarriage FG of such a vehicle, which is guided with a form fit by the running rail FS, is indicated.

Contact rails KS can transmit electrical energy from the running rail FS to the vehicle by way of shoes or contact rollers, also not shown.

The undercarriage FG supports a load carrier LT by way of a rocker W. The stopping and actuating of this rocker W are essential for the invention. For these purposes, a two-armed lever gauge FH, which is guided in an E-shaped shifting gate K fixed to the undercarriage FG, is provided at the rocker. A spring F, which exerts a pressure at the short lever of the lever gauge FH, biases the lever gauge FH in the direction of the free legs of the E-shaped shifting gate K. Also provided at the undercarriage FG is a magnet M, which, when actuated by a current, is pressed against a guide roller FR that guides the lever gauge FH in the shifting gate K so as to bring the lever gauge FH into the position shown in FIG. 1. In this position, a roller R on the lever gauge FH can extend into a guide rail LS that is stationary with respect to the running rail FS. The resulting tilting process for one of the two tilting directions is illustrated in the subsequent figures, in which the magnet M, ejector A and load carrier LT are omitted for the sake of a clear overview.

Figure 2:
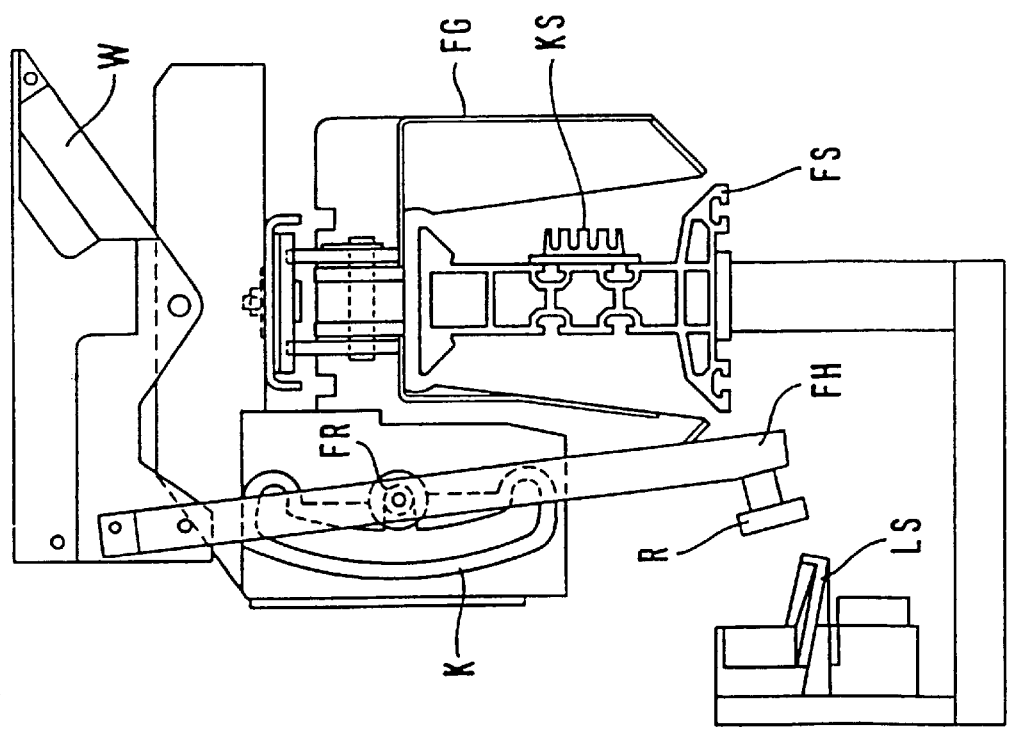

FIG. 2 shows the position that the lever gauge FH assumes when the magnet M (FIG. 1) does not act on the guide roller FR by way of the ejector A (FIG. 1). The guide roller is then located at the outermost end of the center leg of the E-shaped shifting gate K, which does not permit the roller R to reliably engage a guide rail LS at the outermost end of the lever gauge FH.

Figure 3:
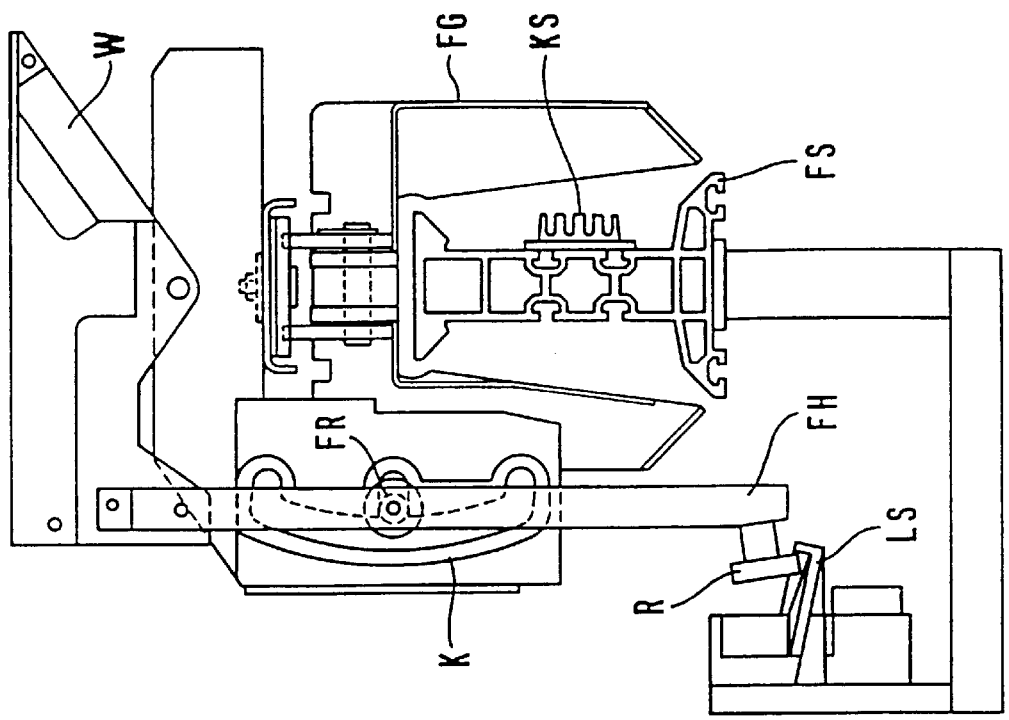
FIGS. 2–6 are simplified representations for five significant operating modes.
Figure 4:
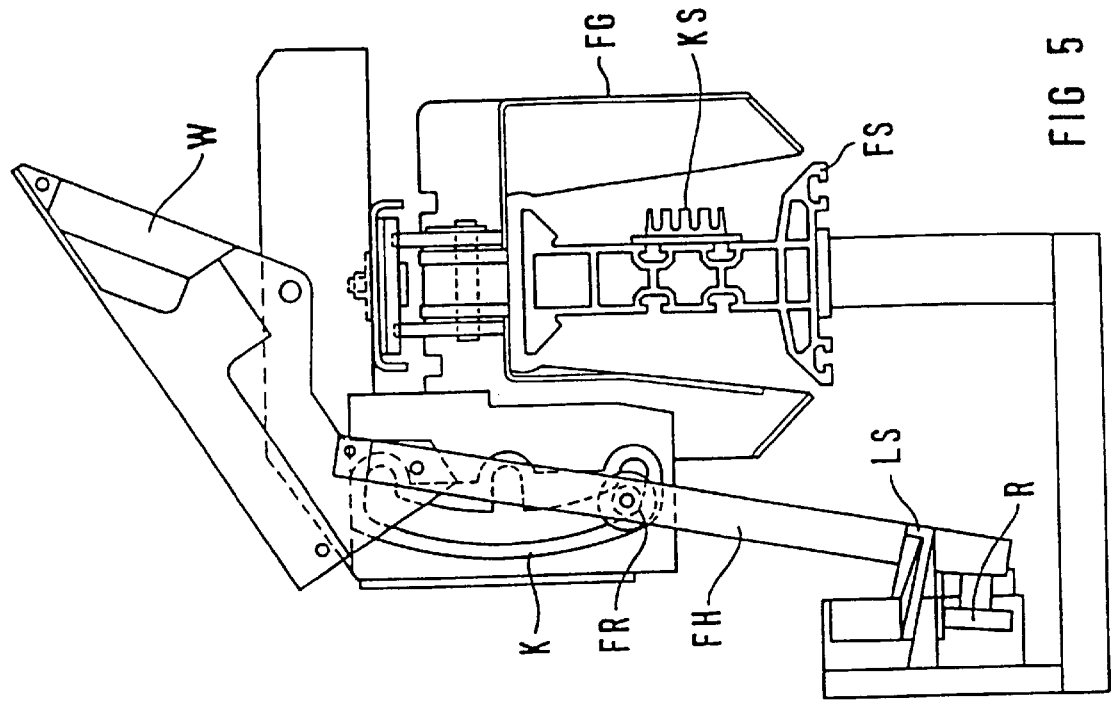
Figure 5:
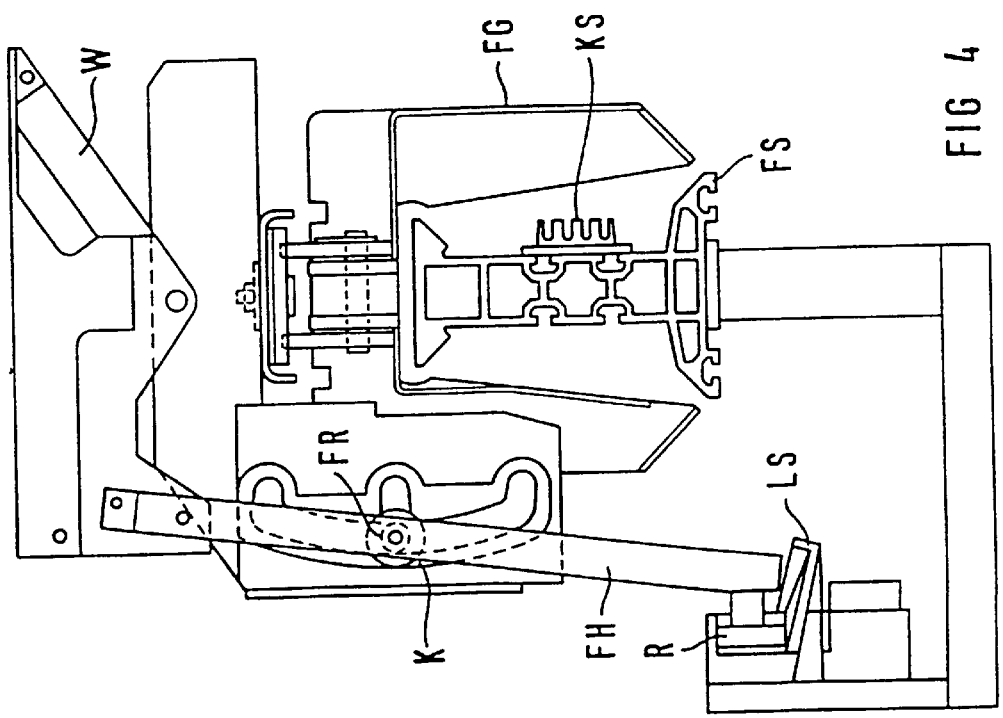
Figure 6:
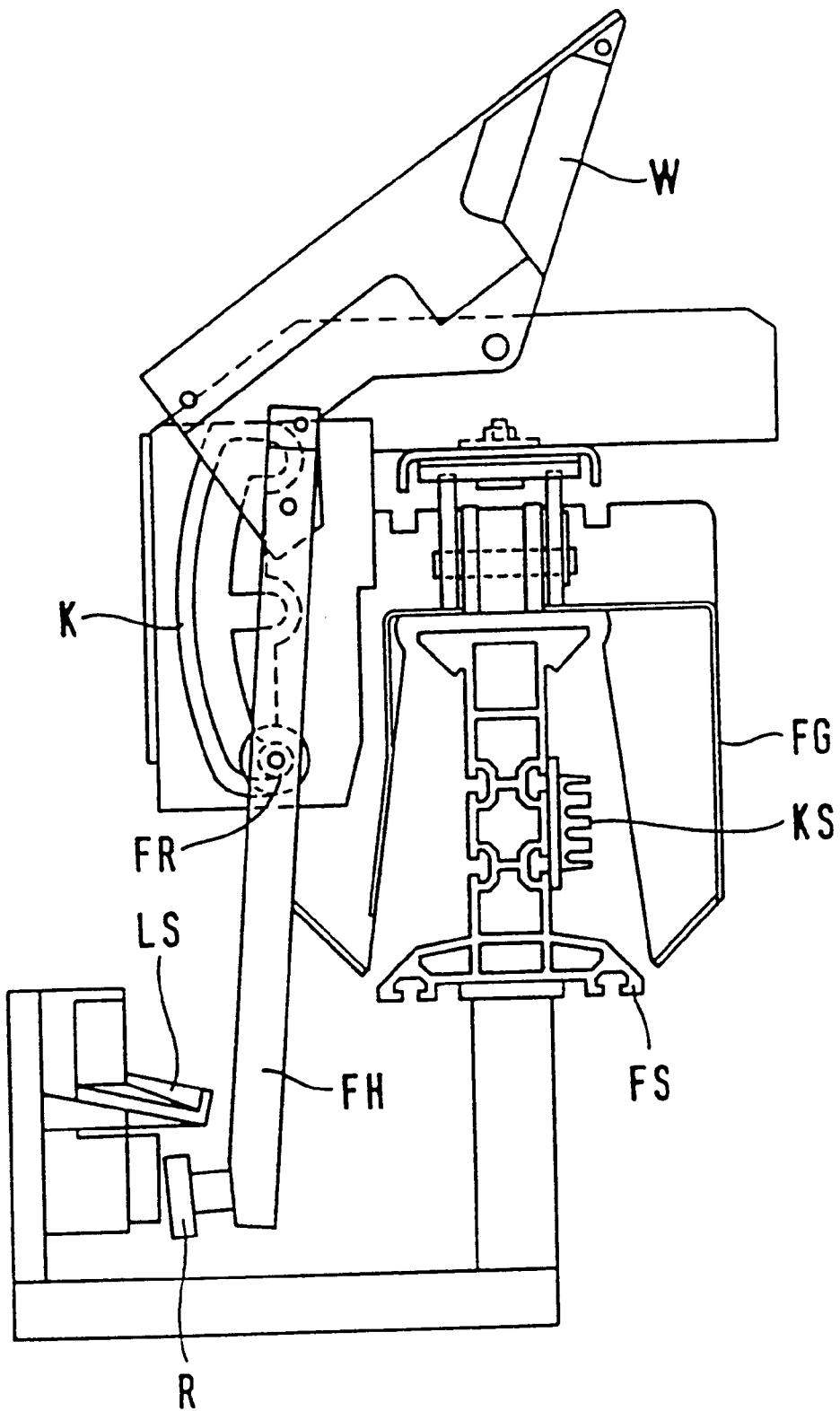

In FIG. 3, it is assumed that, as in FIG. 1, the magnet M is excited (FIG. 1), causing the ejector A to move the guide roller FR in the region of the center leg of the shifting gate K (FIG. 1), but not yet release the roller from its stop region. Thus, the rocker W and the load carrier LT (FIG. 1) are still fixed in the horizontal position, and the items cannot be dumped out. It is now possible, however, that a guide rail LS will capture the roller R, effecting the deflection of the roller R as the vehicle travels further, as shown in FIG. 4. Through such a lateral deflection, the guide roller FR is no longer blocked by a leg of the shifting gate K, and the roller R is moved vertically downward—in the example—as the vehicle continues to move forward, so the roller reaches the position indicated in FIG. 5. The rocker W is tilted to the left and the items are ejected. Due to the tension of the spring F (FIG. 1), upon reaching the lower leg of the E-shaped shifting gate, the guide roller FR runs into this leg and the lever gauge FH is located in the position shown in FIG. 6. In this position, unlike in the horizontal position, it is ensured that the following guide rails along the path are constantly ready to capture the roller.

In principle, in the two tilting positions, the lever gauge FH could be kept out of the engagement region for the guide rails LS through lengthened upper and lower legs of the E-shaped shifting gate K, and only brought into the capture region of the guide rails LS by the actuation of the magnet M (FIG. 1), but this requires additional blocking measures when the load carriers LT are horizontal (FIG. 1) to ensure that the items will not be dumped inappropriately; when the load carriers LT are at an angle (FIG. 1), however, this measure is not absolutely necessary, because no items could be inadvertently dumped.

What is claimed is:

1. A conveyor system for automatically transporting items along a conveyor path, comprising:

at least one guide rail disposed to the side of the conveyor path; and a plurality of vehicles, each comprising:

a load carrier that is movable between a substantially horizontal stable position for receiving items and two different tilted stable positions for unloading;

a lever gauge movably mounted to the vehicle and operatively connected to the load carrier and movable between a non-engaging position where the lever gauge does not contact any of the at least one guide rails, and an engaging position where the lever gauge engages at least one of the at least one guide rails and wherein the engagement causes the lever gauge to be deflected vertically as the vehicle travels along the conveyor path to affect at least one of tilting of the load carrier into one of the tilted stable positions and resetting the land carrier into the substantially horizontal stable position;

a disconnect element located on the vehicle and operatively connected to the lever gauge that moves the lever gauge between the non-engaging position and the engaging position; and an E-shaped shifting gate having upper and lower legs and a center leg, wherein the lever gauge is a single lever arm having a portion guided in the E-shaped shifting gate with the upper and lower legs each defining one of the stable tilted positions, and the center leg defining the stable horizontal position.

2. The conveyor system according to claim 1, wherein the drive and the disconnect element are powered by a common energy source.

* * * * *